(12) United States Patent
Wheeler

(10) Patent No.: US 7,036,634 B2
(45) Date of Patent: May 2, 2006

(54) TRANSMISSION LUBRICANT COOLING SYSTEM

(75) Inventor: Jeff Wheeler, Raymond, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 228 days.

(21) Appl. No.: 10/396,853

(22) Filed: Mar. 25, 2003

(65) Prior Publication Data

US 2004/0188180 A1 Sep. 30, 2004

(51) Int. Cl.
*F01M 5/00* (2006.01)
(52) U.S. Cl. .................................. 184/6.22; 184/6.12
(58) Field of Classification Search ............... 184/6.22, 184/6.21, 6.12; 192/3.28–3.31
See application file for complete search history.

(56) References Cited

U.S. PATENT DOCUMENTS

| | | | | |
|---|---|---|---|---|
| 4,027,643 A | * | 6/1977 | Feenan et al. ........ | 123/196 AB |
| 4,095,644 A | * | 6/1978 | Huff ..................... | 165/299 |
| 4,621,710 A | * | 11/1986 | Tsukamoto et al. ........ | 184/6.27 |
| 4,922,765 A | * | 5/1990 | Hayakawa et al. ........ | 74/15.88 |
| 5,115,887 A | * | 5/1992 | Smith ..................... | 184/6.4 |
| 5,456,129 A | * | 10/1995 | Tane et al. ............... | 74/467 |
| 6,203,467 B1 | * | 3/2001 | Yamamoto et al. ......... | 476/8 |
| 6,520,293 B1 | * | 2/2003 | Ogawa et al. ............. | 184/6.22 |

* cited by examiner

*Primary Examiner*—David Fenstermacher
(74) *Attorney, Agent, or Firm*—Rankin, Hill, Porter & Clark LLP; Mark E. Duell

(57) ABSTRACT

A vehicle transmission lubrication communication system including a pump, a torque converter, an oil cooler, a shifting control assembly, a sump, a main shaft, a counter shaft, and a secondary shaft. The pump withdraws lubricating oil from the sump and pumps the lubricating oil throughout the lubrication system. The pump directs a first flow to the torque converter, a second flow to the shifting control assembly, and a third flow to the main shaft. Oil from the torque converter flows through the oil cooler and, downstream the oil cooler, separates into a first portion of cooled oil that is directed to the secondary and counter shafts and a second portion of the cooled oil that is directed to the sump. Increased flow through the torque converter and oil cooler, as well as directing cooled oil to the secondary and counter shafts, reduces the oil temperature during normal and lockup modes of operation.

7 Claims, 4 Drawing Sheets

TRANSMISSION LUBRICANT COOLING SYSTEM

BACKGROUND OF THE INVENTION

1. Field of the Invention

The present invention concerns transmission lubrication systems and, more particularly, transmission lubrication cooling systems.

2. Description of Related Art

Several vehicle transmission lubrication circuits are known in the art. A first known system is illustrated in FIG. 1, and generally includes a pump 10, a torque converter 12, a shifting control assembly 14, a shaft lubrication (lube) assembly 16, an oil cooler 18, and a sump 20. During normal operation of this system, about eighty percent of the lubricating fluid is directed through the shifting control assembly 14, while about twenty percent of the lubricating fluid is directed through the torque converter 12, shaft lube assembly 16, and oil cooler 18.

The torque converter 12 may either be operated in a lock-up mode or in a non-lockup mode, with the non-lockup mode being referred to hereinafter as normal operation. During normal operation of such transmissions, the torque converter 12 is a primary source of heat generation, while lubricated shafts 16 are secondary sources of heat generation. During operation of the torque converter 12 in a lock-up mode, the torque converter no longer generates heat, but still has a significant amount of residual or built-up heat that must be dissipated. However, the lubricated shafts 16 continue to generate heat that must be dissipated. In the system illustrated in FIG. 1, since all of fluid flowing through the torque converter 12 and shafts 16 passes through the cooler before returning to the sump 20, heat build up is generally not a problem. However, since most of the lubricating fluid is provided to the torque converter 12, the pump 10 may have to be increased in capacity in order to provide adequate lubrication of the shafts 16.

An alternative known transmission lubricating circuit is generally shown in FIG. 2, and includes many of the same components as shown in FIG. 1. However, in FIG. 2 the lubrication of the transmission shafts is split into different lubricating paths. Moreover, during normal operation of the lubricating circuit shown in FIG. 2, about eighty percent of fluid is directed through or over the shifting control 14 and transmission shafts 16, while only about twenty percent of lubricating fluid flow is through the torque converter 12.

Generally, when the torque converter of the lubricating circuit of FIG. 2 is operating normally, pressurized lubricating oil from the pump may be considered as being split into three separate lubricating flows. A first flow ① goes through the torque converter 12, a second flow ② goes through the shift control structure 14, and a third flow ③ goes through the main, secondary, and counter shafts 16. The first flow, after passing through the torque converter 12, passes through the oil cooler 18 before returning to the sump 20. On the other hand, the second and third flows, after passing over and/or through the associated transmission components 14, 16, return directly to the sump 20.

More specifically, and with reference to FIG. 3, the first flow ① is directed through a regulator valve 22, a lockup shift valve 24 and, ultimately to the torque converter 12. The second flow ② is directed to the shifting control structure 14 of the transmission. The third flow ③ splits off of the first flow at the regulator valve 22, and directs the lubricating fluid to the main, secondary, and counter shafts 16 of the transmission. More specifically, the third flow of oil is directed to a pressure tap 26, and splits into a first portion 28 and a second portion 30. The first portion 28 is provided to the main shaft 32, while the second portion 30 flows through a lube check valve 34 to the secondary shaft 36 and the counter shaft 38. The lube check valve 34 serves to limit flow to the shafts 36, 38 when lubricating fluid is cold to prevent creep in neutral.

With regard to the first flow ①, the lubricating fluid is heated in the torque converter 12, and exits via two paths 40, 42 therefrom, each of which eventually lead to the sump 20 via the oil cooler 18. The oil in the first path 40 flows through a torque converter check valve 44 and then to the oil cooler 18, while the oil in the second path 42 flows back through the torque converter lockup shift valve 24, and then to the oil cooler 18. From the oil cooler 18, the cooled lubricating fluid goes through an oil filter 46 and then into the sump 20. From the sump 20, the oil, only a part of which has been cooled, is provided to the pump 10 and recirculated through the lubricating and cooling circuit.

When the torque converter 12 locks up, such as during normal cruising, the first flow path changes, while the second and third flow paths remain unchanged. More specifically, the lockup control valve 48, torque converter shift valve 24, and torque converter lockup timing valve 50 shift positions, and the transmission oil flows through the torque converter shift valve 24 to the torque converter 12, as shown by the arrow labeled ④. However, essentially only one outlet is provided for the oil from the torque converter 12, and oil flows through the single outlet (first path 40), through the torque converter check valve 44, to the oil cooler 18.

The aforementioned system works satisfactorily during normal operation of the transmission. However, during lockup of the torque converter 12 the lubricating oil flow through the torque converter 12, and ultimately through the oil cooler 18, is reduced. This reduction in flow causes the temperature of the oil to increase. In extreme situations, the viscosity of the oil is increased to a level that the oil begins to boil, and may leak from the transmission seals, especially at the second and counter shafts 36, 38. Accordingly, in the prior art transmission oil cooling circuit illustrated in FIGS. 2 and 3, it is sometimes necessary to provide a secondary or supplemental transmission oil cooling circuit when towing is contemplated. Naturally, such supplemental cooling circuits are expensive, and introduce further concerns, such as space concerns, and are generally to be avoided.

Accordingly, there exists a need in the art for an improved or modified transmission oil cooling circuit that eliminates the need for supplemental oil cooling. There further exists a need in the art for an improved transmission oil cooling circuit wherein cooling oil from further heat-generating components is directed through the oil cooler.

SUMMARY OF THE INVENTION

The present invention is directed toward an improved transmission oil cooling circuit that eliminates or reduces the problems encountered in the art. The present invention is further directed toward a transmission oil cooling circuit wherein a portion of the cooled lubricating oil flow from the oil cooler is directed toward the secondary and counter shafts.

In accordance with the present invention, a vehicle transmission lubrication communication system includes a pump, a torque converter, an oil cooler, a shifting control assembly, a sump, and a plurality of shafts. The pump directs a first flow to the torque converter, and a second flow to the shifting control assembly. Oil from the torque converter flows through said oil cooler and, downstream the oil cooler, a first portion of cooled oil is directed to at least one of the plurality of shafts and a second portion of the cooled oil is directed to the sump.

In further accordance with the present invention, the transmission further includes secondary and counter shafts and the first portion of cooled oil is directed to the secondary and counter shafts. The flow of cooling oil to the secondary and counter shafts, as well as an increased flow rate through the torque converter and cooler, cooperate to maintain the lubricating oil at a relatively reduced temperature.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 4:
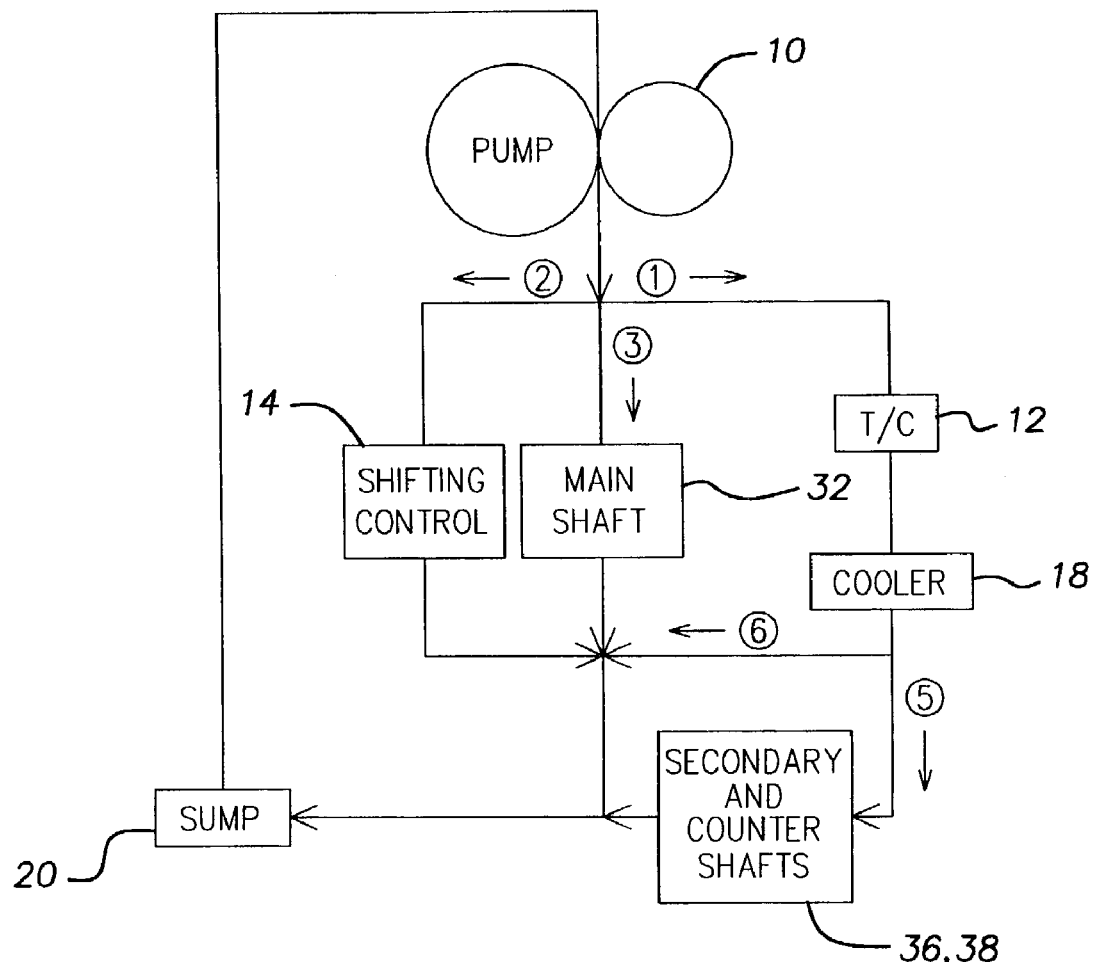
FIG. 4 schematically illustrates a preferred embodiment of the present invention; and, FIG. 5 is a more detailed schematic illustration of the preferred embodiment of the present invention.

With reference to FIG. 4, a preferred embodiment of the present invention is schematically illustrated to include a pump 10, a torque converter 12, a main shaft 32, a secondary shaft 36, a counter shaft 38, a shifting control assembly 14, an oil cooler 18, and a sump 20.

The pump 10 supplies pressurized lubricating oil to three flows. The first flow ① is directed to the torque converter. The second flow ② is directed toward the shifting control assembly 14. The lubricating oil from the shifting control assembly is returned to the sump. The third flow ③ is directed to the main shaft 32. The lubricating oil from the main shaft 32 is returned directly to the sump 20. The lubricating oil from the torque converter 12 is directed through the oil cooler 18. The cooled oil from the oil cooler 18 is split, with a first portion ⑤ of the cooled oil being directed to the secondary and counter shafts 36, 38, and a second portion ⑥ being returned directly to the sump 20. The cooled lubricating oil, after passing through the secondary and counter shafts 36, 38, is returned to the sump 20.

Therefore, according to the present invention, and as noted hereinbefore, the torque converter 12 is ordinarily operated in a normal or non-lockup mode. During such normal operation, the torque converter 12 is the primary heat generating component in the lubrication circuit, and the secondary and counter shafts 36, 38 are secondary heat generating components. Accordingly, the heated lubricating oil from the torque converter 12 is cooled in the oil cooler 18, and thereby copes with the primary heat source in the lubrication circuit. Moreover, since the secondary and counter shafts 36, 38 are provided with cooled lubricating fluid directly from the oil cooler 18 copes with the heat generated in the secondary and counter shafts 36, 38. The flow of cooled fluid from the oil cooler 18 to the sump 20 is further provided to reduce the temperature of the lubricating fluid therein.

Figure 1:
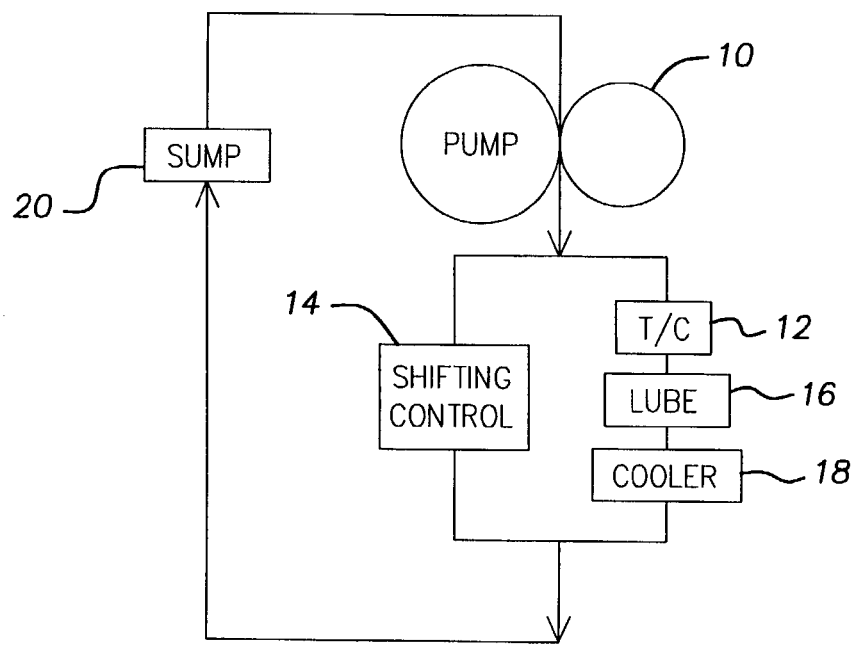
FIG. 1 schematically illustrates a first prior art transmission oil cooling circuit.
Figure 2:
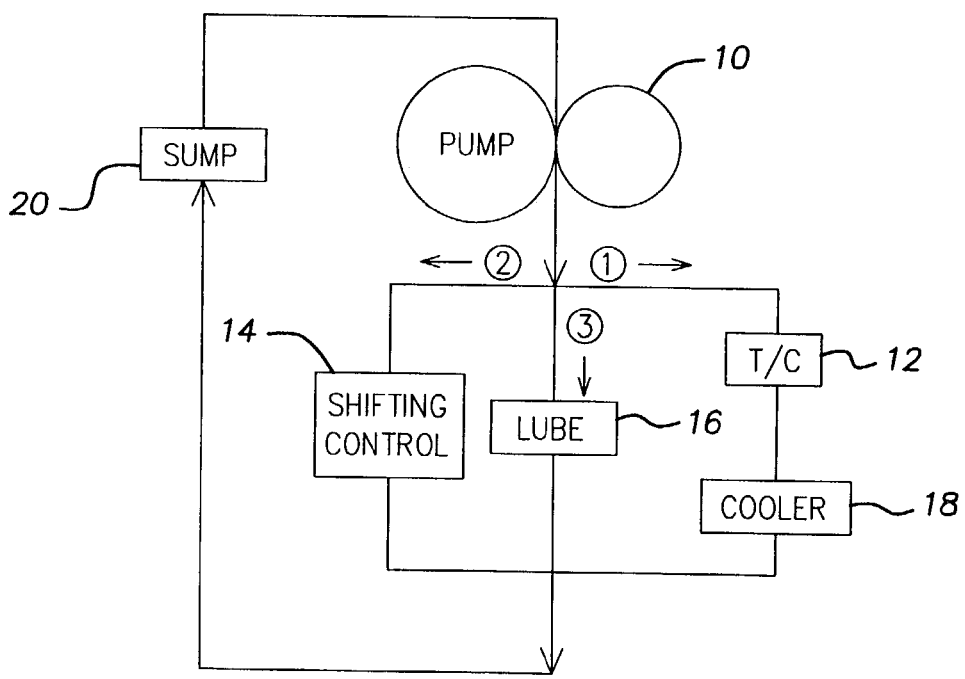
FIG. 2 schematically illustrates a second prior art transmission oil cooling circuit.
Figure 3:
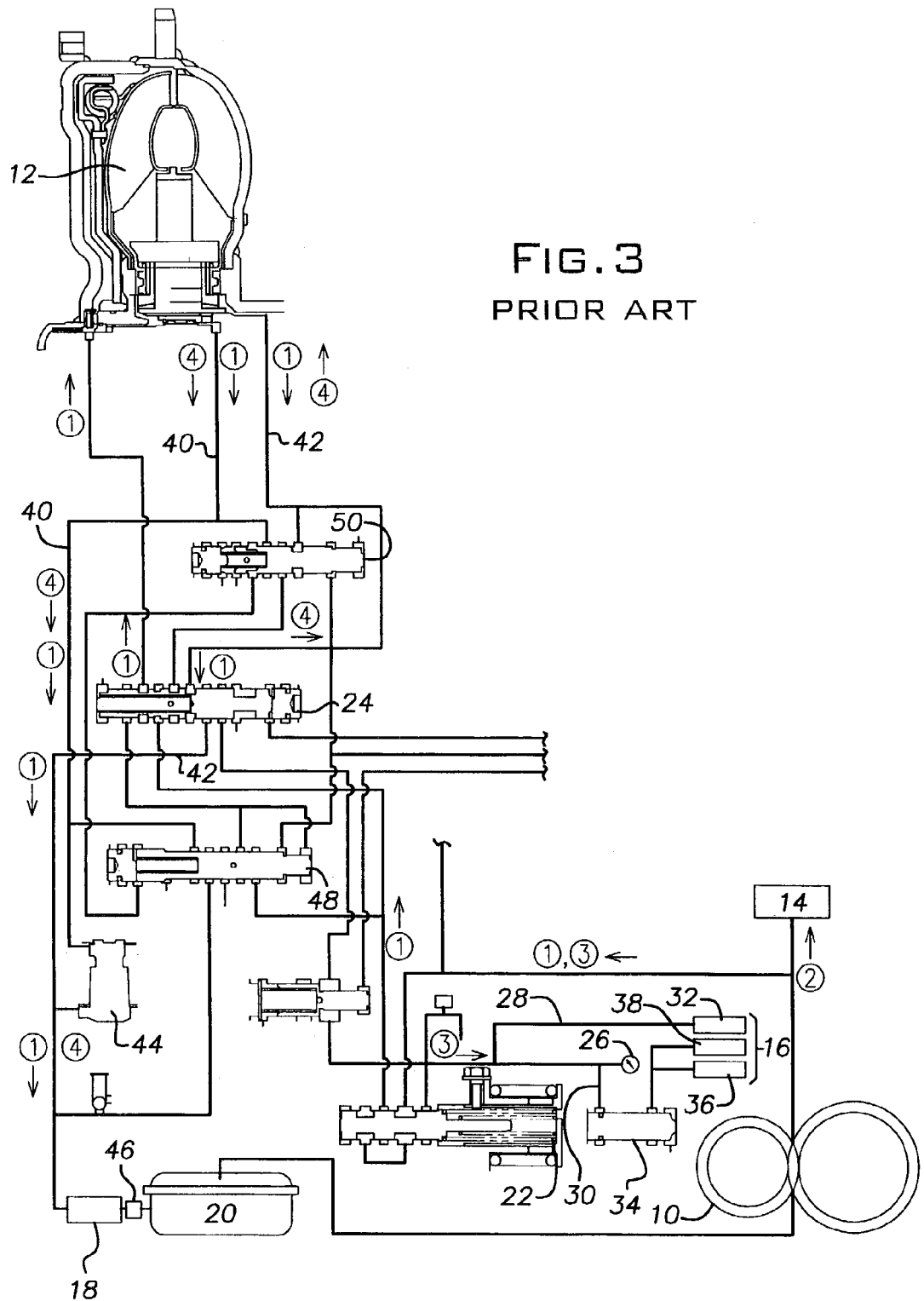
FIG. 3 is a more detailed schematic illustration of the second prior art transmission oil cooling circuit.

It is important to note that the amount of fluid provided to the torque converter 12 of the present invention is relatively increased as compared to the circuit of FIGS. 2 and 3. This increase in flow is due, in large part, to the blocking of parallel flow to the secondary and counter shafts 36, 38, described hereinbefore. While the amount of lubrication directed to the shifting control assembly 14 and the main shaft 32 may vary when the mode of operation changes, the direction of lubrication flow to these components is identical. However, as will be discussed hereinafter, the amount of flow through the torque converter 12, while greater than provided in the prior art circuit of FIGS. 2 and 3, is substantially less during operation in the lockup mode as compared to the normal or non-lockup mode. Moreover, the direction of lubricating oil flow through the torque converter is changed or reversed during lockup mode as compared to the non-lockup mode of operation. In any event, when operating in the lockup mode, the torque converter 12 is no longer the primary heat generating source, but still has residual or built-up heat that is dissipated in the lubricating fluid passing therethrough. Moreover, directing cooled lubricating fluid to the secondary and counter shafts 36, 38 sufficiently reduces the amount of heat that would otherwise be introduced into the lubricating fluid.

Figure 5:
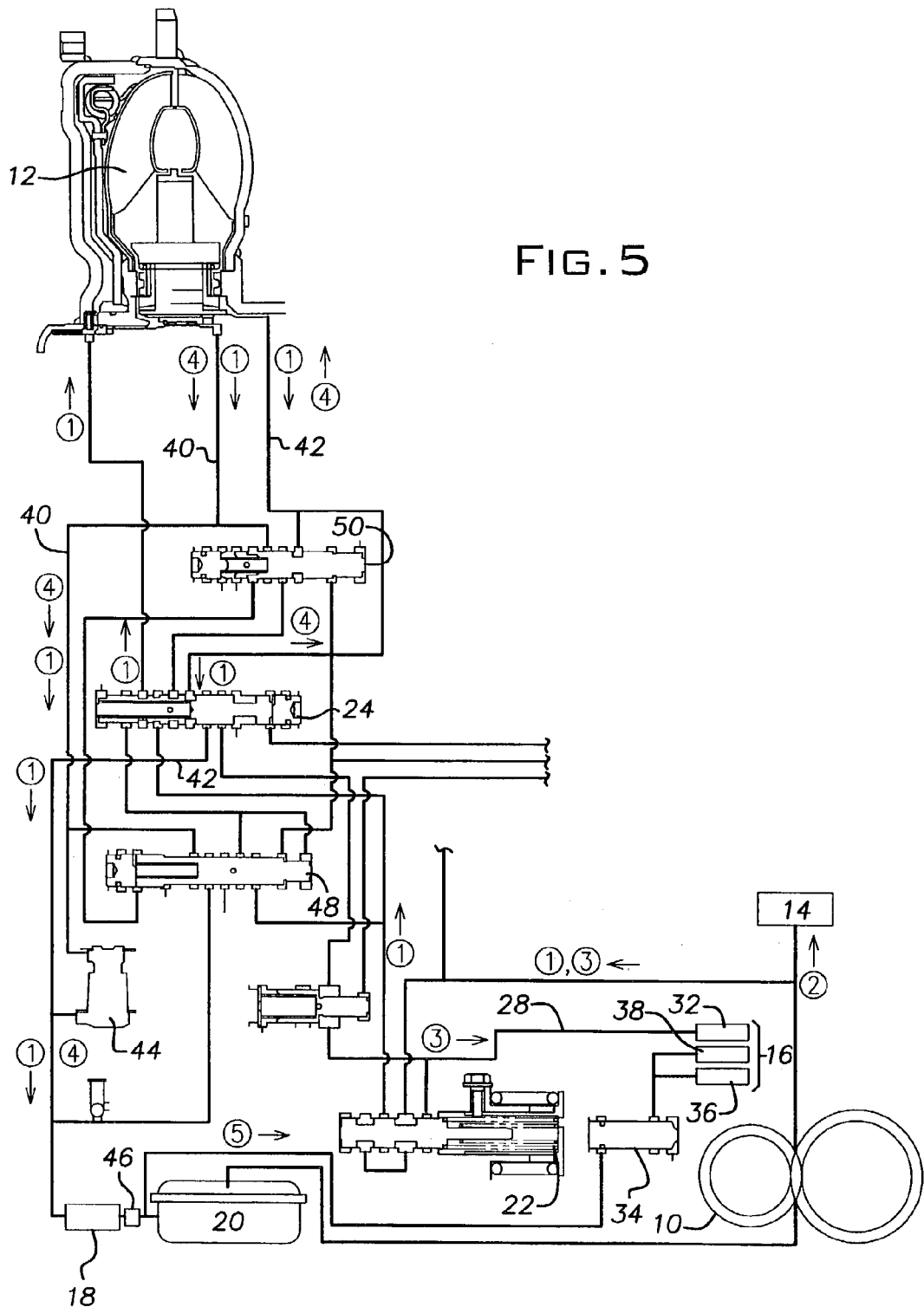

With reference to FIG. 5, the components of the lubrication cooling circuit according to the present invention are shown in more detail. As shown, the circuit includes the pump 10, torque converter 12, shafts 16 (main shaft 32, secondary shaft 36, counter shaft 38), the oil cooler 18, sump 20, oil filter 46. The circuit further includes the torque converter check valve 44, the lockup control valve 48, torque converter lockup timing valve 50, lube check valve 34, and torque converter shift valve 24.

Pressurized oil is provided from the pump to the shift control 14 via the second flow ②. The first and third flows ①, ③ are provided to the regulator 22, which separates the oil into the first flow ①, which is directed toward the torque converter 12, and the third flow ③, which goes to the main shaft 32.

During normal operation, the first flow ① passes from the regulator 22, through the lockup shift valve 24 and then to the torque converter 12. Thereafter, the lubricating fluid, which is heated in the torque converter 12, and exits from the torque converter via two paths 40, 42 to the oil cooler 18. The oil in the first path 40 flows through the torque converter check valve 44 and then to the oil cooler 18, while the oil in the second path 42 flows back through the torque converter lockup shift valve 24, and then to the oil cooler 18. From the oil cooler 18, the cooled lubricating fluid goes through an oil filter 46 and then into the sump 20.

During torque converter lockup, the first flow (now designated with the numeral ④ passes from the regulator 22, through the torque converter shift valve 24 to the torque converter 12, via path 42, as shown by the arrow labeled ④. However, only one outlet is provided for the oil from the torque converter 12, and oil flows through the single outlet (first path 40), through the torque converter check valve 44, and to the oil cooler 18.

In either case, oil from the torque converter 12, after passing through the oil cooler 18 and oil filter 46, is split into two portions or paths. The first portion ⑤ of the cooled oil is supplied to the secondary and counter shafts 36, 38, while the second portion ⑥ is returned to the sump 20. The cooled lubricating oil, after passing through the secondary and counter shafts 36, 38, is returned to the sump 20. The oil in the sump 20, part of which has been cooled, is made available to the pump 10 for recirculation.

In this regard it is noted that in the inventive lubrication circuit of FIGS. 4–5, relative to the prior art circuit of FIGS. 2 and 3, substantially more fluid flow is provided to the torque converter 12 and the oil cooler 18. This increase in cooling flow is due, in part, to repositioning of the fluid flow to the secondary and counter shafts 36, 38 to a position downstream of the oil cooler 18 rather than a position parallel to the torque converter flow.

In tests conducted by the inventors, the rate of fluid flow through the torque converter 12 and cooler 18 during normal operation was increased to 6.8 l/m as compared to 5.8 l/m with the circuit of FIGS. 2–3. Similarly, during lockup, the rate of fluid flow through the torque converter 12 and cooler 18 was increased to 6.2 l/m as compared to 4.2 l/m with the circuit of FIGS. 2–3. The tests further showed that oil was cooler at all points throughout the lubrication circuit, regardless of whether the torque converter 12 is in lockup or non-lockup, using the present invention as compared to the prior art lubricating circuit. Accordingly, the lubricating circuit of the present invention provides increased flow through the oil converter during both lockup and non-lockup operation without increasing the capacity of the pump, without adding further oil coolers, and/or without resorting to a complete redesign of the lubrication circuit.

What is claimed is:

1. A vehicle transmission lubrication communication system, comprising a pump, a torque converter, an oil cooler, a shifting control assembly, a sump, and a plurality of shafts, wherein said pump withdraws lubricating oil from said sump and pumps said lubricating oil throughout said lubrication system, said pump directing a first flow to said torque converter, and a second flow to said shifting control assembly, and wherein oil from said torque converter flows through said oil cooler and, downstream of said oil cooler, a first portion of cooled oil is directed to at least one of said plurality of shafts and a second portion of the cooled oil is directed to said sump.

2. The system according to claim 1, wherein said plurality of shafts include a main shaft, a secondary shaft, and a counter shaft, and wherein said first portion of cooled oil is directed to said secondary and counter shafts.

3. The system according to claim 1, wherein said plurality of shafts include a main shaft, a secondary shaft, and a counter shaft, and wherein said pump directs a third flow of lubricating oil to said main shaft.

4. The system according to claim 3, wherein said first portion of cooled oil is directed to said secondary and counter shafts.

5. A vehicle transmission lubrication communication system, comprising a pump, a torque converter, an oil cooler, a shifting control assembly, a sump, and a plurality of shafts, wherein said pump withdraws lubricating oil from said sump and pumps said lubricating oil throughout said lubrication system, said pump directing a first flow to said torque converter, and wherein oil from said torque converter flows through said oil cooler and, downstream of said oil cooler, a first portion of cooled oil is directed to at least one of said plurality of shafts and a second portion of the cooled oil is directed to said sump.

6. The system according to claim 5, wherein said plurality of shafts include a main shaft, a secondary shaft, and a counter shaft, and wherein said first portion of cooled oil is directed to said secondary and counter shafts.

7. The system according to claim 6, wherein said pump directs a second flow of oil to said shifting control assembly and a third flow of oil to said main shaft, said second and third flows being returned to the sump without passing through the oil cooler.

* * * * *